United States Patent
Barcza

[15] 3,692,798
[45] Sept. 19, 1972

[54] SUBSTITUTED SILYLMETHYL IMIDAZOLES

[72] Inventor: Sandor Barcza, 1480 Pleasant Valley Way, West Orange, N.J. 07052

[22] Filed: May 7, 1971

[21] Appl. No.: 141,383

[52] U.S. Cl..................................260/309, 424/184
[51] Int. Cl. ...........................C07d 49/36, C07f 7/10
[58] Field of Search.......................................260/309

[56] References Cited

UNITED STATES PATENTS

| 3,558,683 | 1/1971 | Belsky et al. ...............260/309 |
| 3,637,735 | 1/1972 | Barcza....................260/309.6 |

OTHER PUBLICATIONS

Birkofer et al. Chem. Abst. Vol. 55, columns 5,484– 5 (1961).
Birkofer et al. Chem. Abst. Vol. 58, column 5,724 (1963).

*Primary Examiner*—Natalie Trousof
*Attorney*—Gerald D. Sharkin, Thomas C. Doyle, Robert S. Honor, Walter F. Jewell, Thomas O. McGovern, Richard E. Vila and Frederick H. Weinfeldt

[57] ABSTRACT

Substituted silylmethyl imidazoles, e.g., 1-(phenyl-dimethyl-silylmethyl)-imidazole, are prepared by reacting substituted silylmethyl halides with imidazole or N-metalated imidazole, and are useful as antimicrobials.

5 Claims, No Drawings

SUBSTITUTED SILYLMETHYL IMIDAZOLES

This application relates to novel silane derivatives which are useful as antimicrobial agents. In particular it relates to phenyl and/or alkyl substituted silylmethyl-imidazoles and to processes for their preparation.

The compounds of this invention may be represented by the following formula:

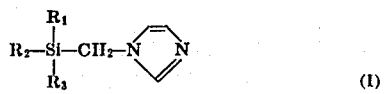

where
$R_1$, $R_2$ and $R_3$ each independently represent lower alkyl, that is,
alkyl having one to four carbon atoms, e.g., methyl, ethyl, isopropyl and the like or phenyl and
pharmaceutically acceptable acid addition salts thereof.

The compounds of formula (I) may be prepared in accordance with the following reaction scheme:

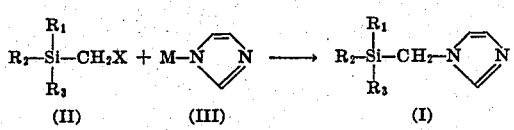

where
$R_1$, $R_2$, and $R_3$ are as defined above
M is hydrogen, an alkali metal, an alkaline earth metal, silver or —MgY and
X and Y are independently halo having an atomic weight of about 35 to 127, preferably 80 to 127.

The compounds of formula (I) are prepared by treating a compound of formula (II) with a compound of formula (III) in an inert solvent and atmosphere. It is preferred that the reaction be carried out in an aprotic solvent such as aliphatic or aromatic hydrocarbons for example, hexane, heptane, benzene toluene or xylene, and especially in polar aprotic solvents, e.g., glyme, diglyme, diethyl ether or tetrahydrofuran. When M is hydrogen, protic solvents such as the lower alkanols, e.g., methanol, ethanol, and the like may be used. Where M is other than hydrogen, the preferred inert gases are nitrogen, argon or helium. When M is hydrogen, the reaction may be carried out in air, but one of the above mentioned inert gases is preferred. The temperature of the reaction is not critical and can be carried out between about 20° to 150°C preferably at the reflux temperature of the system. The product (I) is recovered by conventional techniques, e.g., distillation, extraction and crystallization. The time of the reaction is also not critical but for optimum results the reaction should be run for about 5 to 48 hours.

Many of the compounds of formula (II) and (III) are known and may be prepared by methods described in the literature. The compounds of formula (II) and (III) not specifically disclosed may be prepared by analogous methods using known starting materials.

The preferred compound (III) is the lithium derivative of imidazole; and it is especially preferred when $R_1$, $R_2$, and $R_3$ are all phenyl, where vigorous reaction conditions would normally be required. The lithium derivative (III) is prepared in the usual manner, i.e., by treating the imidazole with an organolithium compound in an inert solvent such as the aprotic solvents described above under an inert atmosphere.

The compounds represented by formula (I) above are useful as antimycrobial agents as indicated by their activity at concentrations of 1 to 100 micrograms/ml in vitro against organisms such as *Staphylococcus aureus*, *Streptococcus faecalis*, *Bacillus subtilis*, *Escherichia coli*, *Proteus vulgaris*, *Histoplasma capsulatum*, *Candida albicans*, *Aspergillus niger*, and the like. This is indicated by their activity when tested using a conventional serial dilution test.

For such usages, compounds (I) may be administered orally, parenterally or topically as such or admixed with conventional pharmaceutical carriers. They can be administered orally in such forms as tablets, dispersible powders, granules, capsules, syrups, and elixirs; parenterally as solutions, suspensions, dispersions, emulsions, and the like, e.g., a sterile injectable aqueous suspension and topically as solutions, salves and the like. These pharmaceutical preparations may contain up to about 90 percent of the active ingredient in combination with the carrier or adjuvant.

Furthermore, these compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate, maleate, malate, tartrate, methanesulfonate, cyclohexylsulfamate and the like.

Although the anti-mycotic effective dosage utilized in the treatment of mycosis will vary depending upon the compound employed and the mode of administration, in general, satisfactory results are obtained when these compounds are orally administered for systemic use at a daily dosage of about 3 mg. to about 100 mg. per kilogram of animal body weight. This daily dosage is preferably administered 2 to 4 times a day, or in sustained release form. For most large mammals in need of said treatment the total daily dosage is from about 100 mg. to about 4 gm. Dosage forms suitable for internal use comprise about 25 mg. to about 2.0 g. of active compound in intimate admixture with a solid of liquid pharmaceutically acceptable carrier or diluent.

The preferred pharmaceutical compositions from the standpoint of preparation and ease of administration are solid compositions, particularly hard-filled capsules and tablets containing about 50 to 500 milligrams of active ingredient.

Tablets and capsules containing the ingredients indicated below may be prepared by conventional techniques and are useful in treating mycosis at a dose of one table or capsule 2 to 4 times a day.

| Ingredients | Weight (mg.) | |
|---|---|---|
| 1-(phenyl-dimethyl-silylmethyl)-imidazole malate | 250 | 250 |
| Tragacanth | 10 | — |
| Lactose | 197.5 | 250 |
| Corn starch | 25 | |

| | Weight (mg) | |
|---|---|---|
| | sterile injectable suspension | oral liquid suspension |
| 1-(phenyl-dimethyl-silylmethyl)imidazole malate | 50 | 50 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminus silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | q.s. for injection, q.s. to 1 ml. | q.s. to 5 ml. |

Talcum 15
Magnesium stearate 2.5

The following pharmaceutical compositions are formulated with the indicated amount of active agent using conventional techniques. The injectable suspension and the oral liquid suspension represent formulations useful as unit doses and may be administered in the treatment of mycosis. The injectable suspension is suitable for administration once or twice a day whereas the oral liquid suspension is suitably administered 2 to 4 times per day for this purpose.

EXAMPLE 1

1—(Phenyl-dimethyl-silylmethyl)-imidazole malate

Into a flask is charged 11.4 g. ($\approx$160 m moles) of imidazole and 200 ml of absolute tetrahydrofuran under nitrogen. The solution is cooled to $-70°$; and with stirring, 10.5 ml. ($\approx$ 144 m moles) of 1.6 M n-butyl-lithium solution in hexane is added. The mixture is allowed to warm to room temperature, and 20 g ($\approx$.72 m moles) of phenyl-iodomethyl-dimethylsilane is added with continued stirring. The contents are refluxed overnight; and after cooling, the mixture is poured into a slight excess of cold 2 N aqueous hydrochloric acid and extracted with chloroform.

The chloroform extracts are set aside. The aqueous phase is made slightly basic with 2 N sodium hydroxide and is extracted three times with approximately 100 ml of ethyl acetate. The combined ethyl acetate extracts are washed with three portions of ($\approx$50 ml) water and dried with magnesium sulfate. The solution is then concentrated in vacuo to yield 4 g of an oily product.

The chloroform extracts above are concentrated to give an oil which is dissolved in dilute hydrochloric acid. This solution is extracted with three portions of ether, which are discarded. The aqueous phase is made slightly basic, and again extracted with ethyl acetate. The extract yields an oily product which is then combined with the oily products above and distilled to give 1-(phenyl-dimethyl-silylmethyl) imidazole (b.p. 125°/0.1 mm Hg.)

The malate salt is prepared by treating 8.64 g (40 m moles) of the 1-(phenyl-dimethyl-silylmethyl)-imidazole base with 5.36 g (40 m moles) of malic acid in methanol (approx. 50 ml). The solution is then concentrated to an oil in vacuo, which solidifies after further treatment at high vacuum to yield 1-(phenyl-dimethyl-silylmethyl imidazole malate (m.p. 75°–76 °C).

EXAMPLE 2

1—(Diphenyl-methyl-silylmethyl)-imidazole maleate

A solution of 11.4 g of imidazole in 200 ml of absolute tetrahydrofuran under nitrogen is cooled to −70° C, and 105. ml of 1.5 M n-butyl lithium in hexane is added. The solution is allowed to warm to room temperature, and 24.4 g of diphenyl-methyl-iodomethyl-silane is then added. The mixture is stirred at room temperature for 0.5 hr, refluxed for 6 hr and then further stirred at room temperature overnight. Approximately 100 ml of benzene is added and the mixture is washed three times with 50 ml water. The combined water phase is back extracted with three 50-ml portions of benzene and the combined organic phases are then dried over magnesium sulfate and concentrated. The concentrate is redissolved in benzene and a solid by product is removed by filtration. The mother liquor is then fractionally distilled. The pure fraction (b.p. 180°/0.1 mm) crystallizes on standing at room temperature and is recrystallized twice from ethanol to yield 1-(diphenyl-methyl-silylmethyl)imidazole (m.p. 79° – 81°C).

Following the above procedure but using trimethyl-iodomethyl silane in place of the diphenyl-methyl-iodomethyl silane, there is obtained 1-(trimethyl-silyl-methyl)imidazole (b.p. 65°C/ 0.5mm.)

The meleic acid salt of 1-(diphenyl-methyl-silyl-methyl)-imidazole is prepared by treating the base with an equimolar amount of maleic acid in methanol. Crystallization by concentration of the homogenous solution and recrystallization from methanol yields 1-(diphenyl-methyl-silylmethyl)imidazole maleate (m.p. 138.5°–139.5°C).

When 1-(trimethyl-silylmethyl)imiazole is used in place of the 1-( diphenyl-methyl-silylmethyl)-imidazole above, there is obtained 1-(trimethyl-silylmethyl)-imidazole maleate (m.p. 101° – 102.5°C).

EXAMPLE 3

1-(Triphenyl-silylmethyl)-imidazole maleate

To 5.19 g of cold (−70°C) imidazole in 75 ml of absolute diglyme is added under nitrogen 45 ml 1.6 M n-butyl lithium solution in hexane. After warming to room temperature and standing for 0.5 hr, the solution is recooled to −70°, and 15 g of triphenyl-iodomethyl-silane dissolved in 60 ml of abs. diglyme is added. The mixture is again brought to room temperature and stirred overnight following which the reactants are heated at 130°C for 1.5 hr and at 50°C overnight. The mixture then is cooled and stirred with 150 ml benzene and 200 ml of water. The agneous phase is separated and extracted with 100 ml benzene. The organic phase are then combined, washed with three 200 ml portion of water, and dried with anhydrous potassium carbonate. After filtering and concentrating under high vacuum, crystals separate which are recrystallized to yield 1-(triphenyl-silylmethyl)-imidazole (m.p. 178.5°–179.5°C).

The maleate salt is prepared by treating 2.3 g of maleic acid with 6.8 g of the product base in hot methanol. On cooling, the salt crystallizes out; and recrystallization from methanol gives 1-(triphenyl-silylmethyl)-imidazole maleate (m.p. 125° to 128°C).

What is claimed is:

1. A compound of the formula

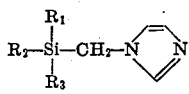

where
$R_1$, $R_2$, and $R_3$ each independently represent lower alkyl or phenyl or a pharmaceutically acceptable acid addition salt thereof.

2. The compound of claim 1 which is 1-(phenyl-dimethyl-silylmethyl)-imidazole.

3. The compound of claim 1 which is 1-(diphenyl-methyl-silylmethyl)-imidazole.

4. The compound of claim 1 which is 1-(trimethyl-silylmethyl)-imidazole.

5. The compound of claim 1 which is 1-(triphenyl-silylmethyl)-imidazole.

* * * * *